May 31, 1932.  H. L. SCHRECK  1,861,365
FLEXIBLE COUPLING
Filed Oct. 9, 1930  2 Sheets-Sheet 1
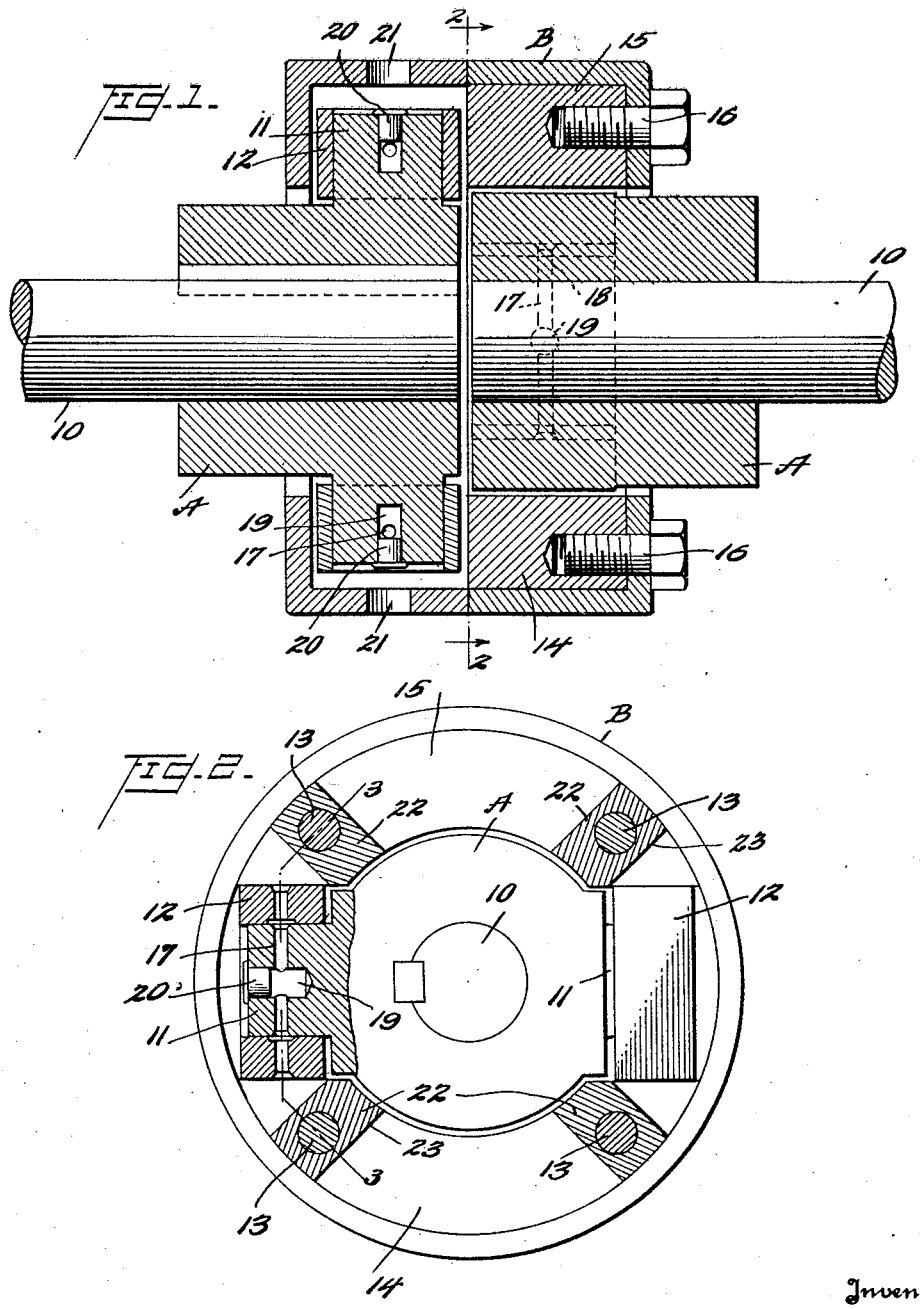

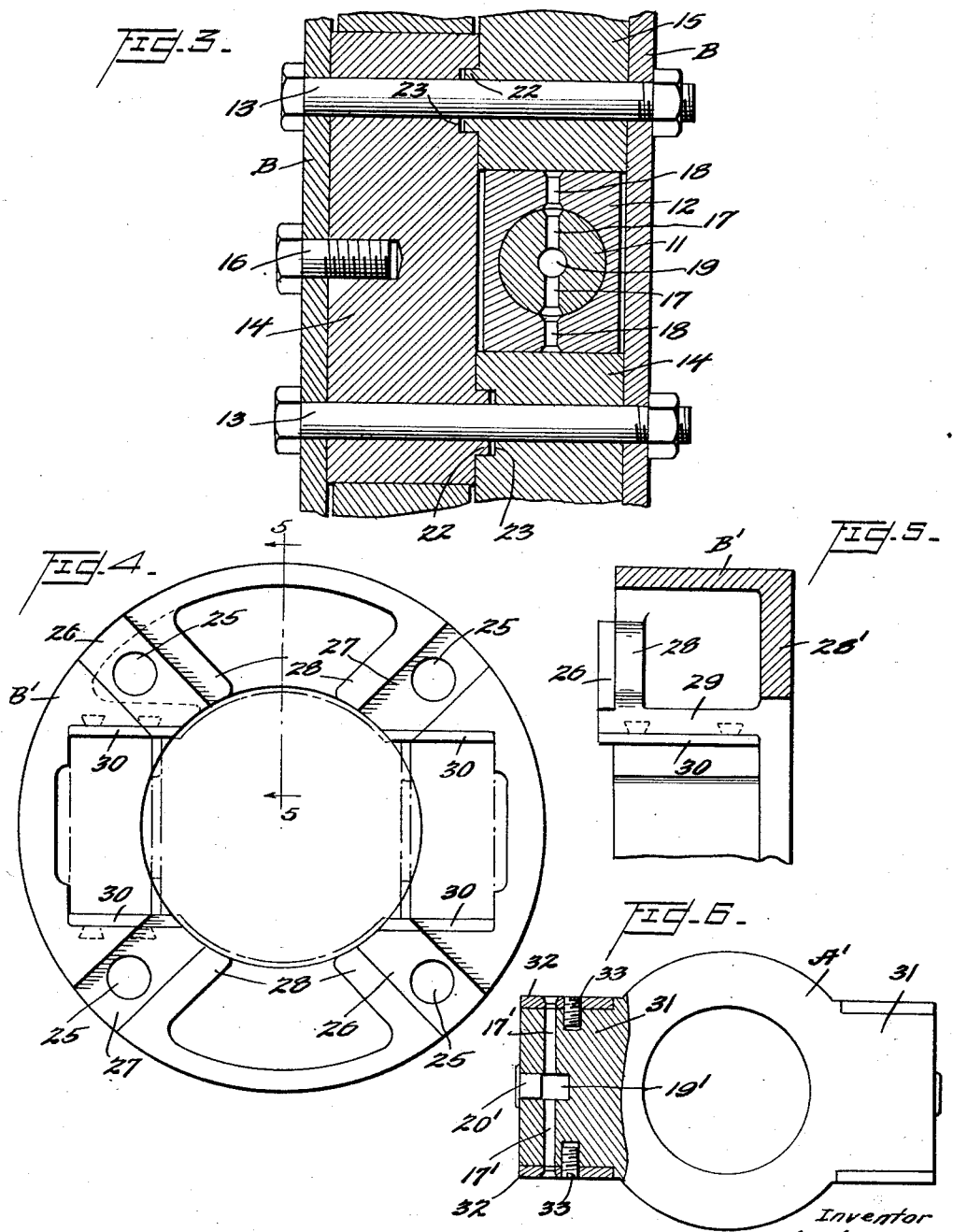

Patented May 31, 1932

1,861,365

UNITED STATES PATENT OFFICE

HANS L. SCHRECK, OF EASTON, PENNSYLVANIA, ASSIGNOR TO TREADWELL ENGINEERING COMPANY, OF EASTON, PENNSYLVANIA, A CORPORATION OF PENNSYLVANIA

FLEXIBLE COUPLING

Application filed October 9, 1930. Serial No. 487,539.

This invention relates to flexible shaft couplings of the Oldham type.

A coupling of the Oldham type comprises hubs carried on the ends of a pair of adjacent and substantially aligned shafts, each hub being formed with two diametrically opposed projections having parallel bearing faces normal to the direction of rotation, with the projections on one hub angularly spaced 90° from those on the other hub, and an intermediate member or shell providing jaws against which the bearing faces of the projections have sliding contact.

One of the objects of the present invention is to embody in a coupling of this kind a construction which permits universal angular misalignments of the shafts independently of the sliding bearing surfaces of the coupling or, in other words, to combine a coupling of the Oldham type and a true universal coupling. I have found that such a combination effects a more efficient torque transmission under heavy loads and is otherwise desirable.

Another object is to provide an improved construction of the intermediate member or shell of the coupling, particularly adapted for heavy duty. According to the present invention, the shell is formed in two complementary sections meeting in a plane transverse to the coupling axis and held together by clamping bolts, with opposed portions of the shell having interlocking feathers and grooves. Such a construction provides for convenient assembly and disassembly of the coupling and at the same time produces an extremely strong shell in that the torque is transmitted through the extensive contact surfaces provided by the feathers and grooves, the clamping bolts being required merely to hold the sections together.

A still further object is to provide a conveniently accessible and efficient lubricating means for the bearing surfaces of the coupling. Additional objects and advantages of the invention will become apparent hereinafter.

Referring to the accompanying drawings:

Figure 1 is a sectional view through the axis of a coupling embodying the invention;

Figure 2 is a section on line 2—2 of Figure 1;

Figure 3 is a sectional detail on line 3—3 of Figure 2;

Figure 4 is an end view of a modified form of coupling shell;

Figure 5 is a section on line 5—5 of Figure 4; and

Figure 6 is an end view, partly in section, of a modified form of coupling hub.

The coupling comprises two hubs A keyed, respectively, to the opposed ends of shafts 10, and a shell B surrounding the hubs and coacting therewith to transmit the torque of one shaft to the other, while permitting angular and axial misalignments of the shafts in a manner hereinafter described.

In the preferred construction, as illustrated in Figures 1, 2, and 3, each hub A has, adjacent its inner end, diametrically opposed projecting cylindrical portions or trunnions 11, with the trunnions on one hub angularly spaced 90° from those on the other hub. Each trunnion is rotatable in a slipper block 12 which, as shown in Figure 3, is of rectangular cross-section. These slipper blocks are adapted to fit between jaws positioned in the shell B and are permitted to have limited sliding movements relatively to the jaws to permit axial movements and axial misalignments of the shafts.

Shell B is composed of two complemental sections having abutting edges in a plane at right angles to the coupling axis and clamped together by four equispaced bolts 13 which pass through the shells and through jaw blocks 14 and 15 enclosed thereby. Each of these jaw blocks is additionally held in its respective section by a screw bolt 16 which extends only partly through the block, as shown in Figure 1. There are two spaced jaw blocks in each section of the shell, each block extending through an arc somewhat greater than 90° and having its ends defined by coplanar surfaces, the two planes passing through the faces of the blocks being parallel and equidistant from the coupling axis, as indicated in Figure 2, thus providing a pair of jaws in each section. The jaws in one section are displaced 90° from those in the other section so as to receive the slipper blocks 12 carried by the hub trunnions, the parallel bearing faces of the slipper blocks having a sliding fit in said jaws.

The working surfaces are conveniently and efficiently lubricated by the provision of oil ducts 17 and 18 extending radially through the trunnions 11 and the slipper blocks and a central reservoir 19 with which the ducts communicate. Lubricant is adapted to be supplied to the reservoir through a ball valve 20, the introduction of the lubricant being permitted by apertures 21 in the shell.

In order to relieve the bolts 13 of the load carried by the coupling, the opposed faces of jaw blocks 14 and 15 are formed with coacting feathers 22 and grooves 23 extending radially of the coupling axis, each block having a groove and a key coacting respectively, with a key and a groove of the opposed block. Thus the torque is transmitted between the blocks through extensive contact surfaces normal to the direction of rotation, and bolts 13 will be required merely to clamp the parts together.

From the above described construction, it will be apparent that the shafts 10 are permitted free universal angular movement with respect to each other, since each shaft is freely rotatable about the axis of its trunnions 11 and since the trunnion axis of one shaft is at right angles to that of the other shaft. The coupling also permits lateral displacements of the shafts and axial movements thereof, since the slippers are slidable radially and axially in the jaws, sufficient clearances being provided between the hubs and shell to allow small displacements, as indicated in Figures 1 and 2.

Variations from the preferred construction may be made within the limits of the invention as defined in the broader claims appended hereto. Thus, in Figures 4 and 5 there is shown a shell B' in which the jaws for the reception of the slipper blocks are formed integrally with the shell, separate jaw blocks being dispensed with. In this modified construction as in the construction already described, the shell is composed of two complemental sections held together by four bolts adapted to pass through aligned apertures 25 in the shell sections. In the present construction, however, alternate feathers 26 and grooves 27 are formed on radially extending portions 28 of the section and are adapted to coact with similar grooves and feathers on corresponding opposed portions of the other section. The jaws are provided by bridge pieces 29 extending between the radially extending portions 28 and the outer flange 28' of the shell, the faces of these bridge pieces being covered by renewable wear plates 30 of Babbitt metal or similar material.

It is also within the scope of the broad invention to employ a modified hub construction, such as illustrated in Figure 6. Here the hub A', instead of being formed with trunnions, has integral rectangular projections 31 adapted to fit in shell jaws of either of the constructions described above. The working faces of these rectangular projections may be covered by wear straps 32 secured by screws 33, and lubricant is adapted to be conveyed to said surfaces through ducts 17', the lubricant being introduced through a valve 20' into a central reservoir 19' as in the construction previously described.

Having thus described the invention, what is claimed as new and desired to be secured by Letters Patent is:—

1. A flexible shaft coupling comprising opposed shafts each carrying two diametrical projections formed with parallel bearing surfaces, the projections of one shaft being displaced 90° from those of the other shaft, and a shell enclosing said projections and providing jaws in which the projections have a sliding fit, said projections each being formed with oil ducts opening at the bearing surfaces thereof and with a central reservoir communicating with said ducts and opening through the end face of the projection and provided with valve means normally closing the same, said shell being formed with apertures aligned with said reservoirs for the introduction of lubricant thereto.

2. A flexible shaft coupling comprising opposed shafts each carrying two diametrical projections formed with parallel bearing faces, the projections of one shaft being angularly spaced 90° from those of the other shaft, and an intermediate member providing jaws in which the projections have a sliding fit, said objections each being formed with oil ducts opening at the bearing faces thereof and with a central reservoir communicating with said ducts and opening through the end of the projection and provided with valve means normally closing the same.

In testimony whereof I hereunto affix my signature.

HANS L. SCHRECK.